United States Patent
Cornelius et al.

(10) Patent No.: US 9,771,803 B2
(45) Date of Patent: Sep. 26, 2017

(54) METHOD FOR PROFILING A REPLACEMENT BLADE AS A REPLACEMENT PART FOR AN OLD BLADE FOR AN AXIAL-FLOW TURBOMACHINE

(75) Inventors: Christian Cornelius, Sprockhovel (DE); Torsten Matthias, Mulheim an der Ruhr (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 743 days.

(21) Appl. No.: 14/241,485

(22) PCT Filed: Aug. 14, 2012

(86) PCT No.: PCT/EP2012/065842
§ 371 (c)(1),
(2), (4) Date: Feb. 27, 2014

(87) PCT Pub. No.: WO2013/034402
PCT Pub. Date: Mar. 14, 2013

(65) Prior Publication Data
US 2014/0212282 A1    Jul. 31, 2014

(30) Foreign Application Priority Data
Sep. 9, 2011 (EP) .................................... 11180679

(51) Int. Cl.
*F01D 5/14* (2006.01)
*F01D 5/12* (2006.01)
(Continued)

(52) U.S. Cl.
CPC ............... *F01D 5/12* (2013.01); *B23P 6/005* (2013.01); *F01D 5/141* (2013.01); *F01D 5/147* (2013.01);
(Continued)

(58) Field of Classification Search
CPC . F01D 5/147; F01D 5/141; F01D 5/12; B23P 6/005
See application file for complete search history.

(56) References Cited

U.S. PATENT DOCUMENTS

| 4,585,395 A | 4/1986 | Abbott |
| 5,642,985 A | 7/1997 | Spear et al. |

(Continued)

FOREIGN PATENT DOCUMENTS

| CN | 101476493 A | 7/2009 |
| DE | 1903642 A1 | 8/1970 |

(Continued)

OTHER PUBLICATIONS

RU Office Action/communication dated Jun. 10, 2016, for RU application No. 2014113852.
(Continued)

*Primary Examiner* — Justin Seabe
(74) *Attorney, Agent, or Firm* — Beusse Wolter Sanks & Maire

(57) ABSTRACT

A method for profiling a replacement blade for an axial turbomachine is provided. The method includes: measuring hub contour geometry and housing contour geometry of the flow channel of the old blade and the axial position of the centre of gravity of the blade aerofoil of the old blade; laying out geometry of the blade aerofoil of the replacement blade, the blade aerofoil having a rearward sweep on its leading edge; defining a region of the blade aerofoil near the mounting and in which positive influence of the rearward sweep on the degree of stage efficiency is rated as low; and axially displacing the replacement blade aerofoil section arranged outside this region in the upstream direction, until the axial position of the centre of gravity of the blade aerofoil of the replacement blade coincides with the old blade. In the region from the mounting-side section to the (Continued)

displaced blade aerofoil section of the replacement blade, the leading edge is inclined downstream towards the mounting such that the blade aerofoil has a transition sweep in this region.

11 Claims, 2 Drawing Sheets

(51) Int. Cl.
    *B23P 6/00*         (2006.01)
    *F01D 9/02*         (2006.01)

(52) U.S. Cl.
    CPC ............ *F01D 9/02* (2013.01); *F05D 2230/80* (2013.01); *Y10T 29/4932* (2015.01)

(56) References Cited

U.S. PATENT DOCUMENTS

| | | | |
|---|---|---|---|
| 7,101,145 B2* | 9/2006 | Tsuchiya | F01D 5/141 415/119 |
| 8,056,227 B2 | 11/2011 | Demania | |
| 8,167,548 B2 | 5/2012 | Greim et al. | |
| 2003/0012645 A1 | 1/2003 | Donnaruma et al. | |
| 2008/0148564 A1 | 6/2008 | Burton et al. | |
| 2009/0123276 A1 | 5/2009 | Greim | |
| 2009/0208339 A1 | 8/2009 | Cherolis et al. | |
| 2010/0068064 A1* | 3/2010 | Nagai | F01D 5/141 416/223 A |
| 2011/0225979 A1 | 9/2011 | Hoeger et al. | |
| 2013/0008170 A1* | 1/2013 | Gallagher | F01D 5/141 60/772 |

FOREIGN PATENT DOCUMENTS

| | | |
|---|---|---|
| DE | 102008055824 | 5/2009 |
| EP | 2216507 | 8/2010 |
| GB | 2151310 | 7/1985 |
| JP | 60178902 | 9/1985 |
| JP | S60178902 A | 9/1985 |
| JP | 2010180881 A | 8/2010 |
| RU | 2384750 C1 | 3/2010 |
| WO | 2009103528 A2 | 8/2009 |
| WO | WO2009103528 | 8/2009 |
| WO | 2010063271 A2 | 6/2010 |

OTHER PUBLICATIONS

Ischlinsky A. Yu, "Neue Polystechnische Lexikon / Bolschaja Rossijskaja Enyklopedia", Mokau Verlag, pp. 513, 2000. (Translated Definitions from Ischlinsky A.Yu,"New Polytechnic Dictionary/Great Encyclopedia of Russian Language," 2000, p. 513, published by Moscow publishing house, Russia.).

RU Office Action dated Jan. 16, 2017, for RU patent application No. 2014113852.

RU grant decision dated Apr. 25, 2017, for RU patent application No. 2014113852.

* cited by examiner

METHOD FOR PROFILING A REPLACEMENT BLADE AS A REPLACEMENT PART FOR AN OLD BLADE FOR AN AXIAL-FLOW TURBOMACHINE

CROSS REFERENCE TO RELATED APPLICATIONS

This application is the US National Stage of International Application No. PCT/EP2012/065842 filed Aug. 14, 2012, and claims the benefit thereof. The International Application claims the benefit of European Application No. EP11180679 filed Sep. 9, 2011 . All of the applications are incorporated by reference herein in their entirety.

FIELD OF INVENTION

The invention relates to a method for profiling a replacement blade as a replacement part for an old blade for an axial-flow turbomachine, the replacement blade being a rotor blade or a stator blade for a gas turbine.

BACKGROUND OF INVENTION

A gas turbine, in particular a non-stationary gas turbine, usually has an operating life of about 30 years. During this period of time, technical innovations, particularly for improving the thermal efficiency of the gas turbine, have hitherto become commercially viable. It is desirable that an already installed gas turbine is equipped at least partially with these technical innovations, in order thereby to achieve a corresponding increase in efficiency in the gas turbine. To implement the technical innovations in the already installed gas turbine, it is customary to provide modified components which have the technical innovations and are exchanged with their older counterparts in the gas turbine. The aim is to exchange as small a number of components as possible in the gas turbine in order to keep the outlay in terms of upgrading and the costs of this as low as possible.

The stationary gas turbine for power station use is conventionally designed in an axial type of construction. The compressor of the gas turbine usually has a plurality of stages arranged axially one behind the other in the through-flow direction, each stage comprising moving blades assigned to a rotor and forming a moving blade ring and guide blades forming a guide blade ring. The moving blades rotate, together with the rotor, with respect to the fixed guide blades, while, in particular, the fluidic efficiencies of the moving blades and guide blades determine the fluidic efficiency of the stage. It has been possible in recent years to achieve considerable improvements in stage efficiency, using numerical flow solvers in the profiling of the blades. Thus, it is desirable that, particularly for the compressor of the gas turbine, the existing blading is removed and is replaced with blading designed from modern standpoints. The rotor remains in the gas turbine, and therefore the mechanical interface between the blading and the rotor at the blade fastening remains unchanged.

If, however, the profiling of the new blading leads to a change in the centers of gravity of the airfoils, the mechanical stress upon the blade fastening changes. As a rule, this leads to adverse loads upon the blade fastening, therefore the profiling of the new blading has to be coordinated with the maximum permissible load values of the blade fastening. As a rule, this results in restrictions in the profiling of the new blading, the result of this being that efficiency increases which can be achieved in principle cannot be implemented.

Particularly where the compressor rotor blades are concerned, it became clear that, in profiling, introducing a rearward sweep in the lower half of the flow duct increases the aerodynamic performance of the compressor rotor blades. This, however, entails a corresponding displacement of the blades' centers of gravity and of the blade trailing edge in the direction of the downstream guide blade roll. Owing to this displacement of centers of gravity, the recently prevailing symmetry of the load upon the blade fastening within the blade grooves is impaired, so that the degree of rearward sweep is severely limited in the profile of the compressor rotor blades. In order nevertheless to provide the compressor rotor blades with the rearward sweep, the deviation of the stringing line of axial sections of the new blading compared with the stringing line of axial sections of the old blading was limited within a still permissible range. What was achieved thereby was that the load in the blade root and at the circumferential groove does not become inadmissibly high when the gas turbine is in operation. On account of this, however, an appreciable potential and efficiency improvement remained unused.

This could be remedied by shortening the chord length of the blade root of the new blading. However, this measure would be disadvantageous in terms of the aerodynamic load bearing capacity and stability of the new blading and its structural integrity.

US 2003/012645 A1 describes a method for retrofitting a guide blade, in which an existing guide blade is replaced by a new guide blade.

WO 2009/103528 A2 discloses compressor blades having a sinusoidal sweep. The sinusoidal form of the sweep results in transition sweeps. This is intended to satisfy requirements with respect to increased efficiency and noise control

SUMMARY OF INVENTION

An object herein is to provide a method for profiling a replacement blade as a replacement part for an old blade for an axial-flow turbomachine, a rotor blade and a stator blade for a gas turbine and also the gas turbine with the rotor blade and/or with the stator blade, the gas turbine having high thermodynamic efficiency.

This object is achieved by means of the features of the independent claims. Preferred refinements of these are specified in the further patent claims.

The method according to aspects of the invention for profiling a replacement blade as a replacement part for an old blade for an axial-flow turbomachine has the steps: acquisition of the hub contour geometry and casing contour geometry of the flow duct of the old blade which is tension-mounted on one side of the hub or casing and of the axial position of the center of gravity of the airfoil and/or of the maximum utilizable axial construction space of the old blade; design of the geometry of the airfoil of the replacement blade, the tension-mounting-side section of the airfoil of the replacement blade lying essentially at the same location as the tension-mounting-side section of the airfoil of the old blade, and the airfoil of the replacement blade being inclined at its leading edge upstream with respect to the tension mounting with a view to optimizing the stage efficiency, with the result that the airfoil has a rearward sweep; definition of a tension-mounting-near region of the airfoil of the replacement blade, in which region the positive influence of the rearward sweep upon the stage efficiency is classified as low; axial displacement of the airfoil portion, arranged outside the region, of the replacement blade upstream until the axial position of the center of gravity of the airfoil of the replacement blade coincides essentially with the axial position of the center of gravity of the airfoil of the old blade and/or the mechanical integrity of the replacement blade is achieved, utilizing the maximum utilizable axial construction space of the old blade, the leading edge being inclined downstream with respect to the tension mounting in the region from the tension-mounting-side section of the airfoil of the replacement blade as far as the displaced airfoil portion of the replacement blade, with the result that the airfoil has a transition sweep in this region.

Preferably, the axial-flow turbomachine is a compressor and/or a turbine of a gas turbine. The rotor blade according to aspects of the invention for the gas turbine is the replacement blade which is designed by means of the method according to the invention. Furthermore, the stator blade according to aspects of the invention is the replacement blade which is designed by means of the method according to the invention. The gas turbine according to aspects of the invention has the rotor blade and/or the stator blade.

The compressor blade according to aspects of the invention has an airfoil which has a leading edge, the airfoil being inclined at the leading edge upstream with respect to the tension mounting of the airfoil with a view to optimizing the stage efficiency, with the result that the airfoil has a rearward sweep, a tension-mounting-near region of the airfoil being defined, in which the positive influence of the rearward sweep upon stage efficiency is classified as low, the leading edge being inclined downstream with respect to the tension mounting in the region of the airfoil, with the result that the airfoil has a transition sweep in this region.

The tension-mounting-near region of the airfoil of the replacement blade in which the positive influence of the rearward sweep upon the stage efficiency is classified as low corresponds preferably to the radial extent of the hub boundary layer or the tension-mounting-side secondary flow. The region is preferably 5% to 15% of the blade height of the replacement blade.

The chord length of the blade root of the replacement blade preferably corresponds essentially to the chord length of the blade root of the old blade. Furthermore, the method preferably has the step: design of the geometry of the airfoil of the replacement blade, the airfoil being inclined at its leading edge upstream with respect to the side facing radially away from the tension mounting with a view to optimizing the stage efficiency, with the result that the airfoil has a forward sweep outside the rearward sweep. Moreover, it is preferable that the rearward sweep of the leading edge of the replacement blade extends only in the radial tension-mounting-side half of the flow duct.

The transition sweep is designed according to aspects of the invention as a forward sweep. As a result of this, the center of gravity of the airfoil of the replacement blade is displaced forward in the flow direction, with the result that the center of gravity of the airfoil of the replacement blade assumes the position of the center of gravity of the airfoil of the old blade and/or the mechanical integrity of the replacement blade is achieved, utilizing the maximum utilizable axial construction space of the old blade. In the gas turbine, the old blade is replaced by the replacement blade.

In this case, the old blade is demounted, for example, from a rotor of the gas turbine and the replacement blade is mounted in place of the old blade. The old blade or replacement blade is usually tension-mounted with a form fit on the rotor of the gas turbine. Since the center of gravity of the replacement blade lies essentially in the same axial position as the center of gravity of the old blade and/or the mechanical integrity of the replacement blade is achieved, utilizing the maximum utilizable axial construction space of the old blade, the stress upon the form-fit fastening of the replacement blade is essentially equal to the load upon the form-fit fastening of the old blade. This is advantageous particularly because, by the rearward sweep being provided in the profiling of the replacement blade, to achieve high stage efficiency the mechanical load upon the blade fastening when the gas turbine is in operation with the replacement blade is essentially equal to that arising when the gas turbine is in operation with the old blade.

The transition sweep is restricted locally to the region which is near the tension mounting and which impairs the positive influence of the rearward sweep upon stage efficiency to only a slight extent. As a result, the aerodynamic influence of the transition sweep is low, whereas structural disadvantages of a blade provided as standard with a rearward sweep are reduced. The transition sweep is preferably limited to a region of 5% to 15% of the blade height of the replacement blade. The benefit of the rearward sweep can thus be utilized in the range of higher flow velocities outside 5% to 15% of the blade height of the replacement blade. Moreover, in the rotor blade according to aspects of the invention, the distance from a downstream conventional stator blade is greater than if a rotor blade were provided in the customary way with the rearward sweep and without the transition sweep. Consequently, excitation caused by aerodynamic forces brought about by the rotation of the rotor blade according to aspects of the invention is slight.

BRIEF DESCRIPTION OF THE DRAWINGS

A preferred embodiment of a rotor blade, profiled by means of the method according to the invention, as a replacement blade for an old blade for a gas turbine is explained below by means of the accompanying diagrammatic drawings in which.

DETAILED DESCRIPTION OF INVENTION

Figure 1:
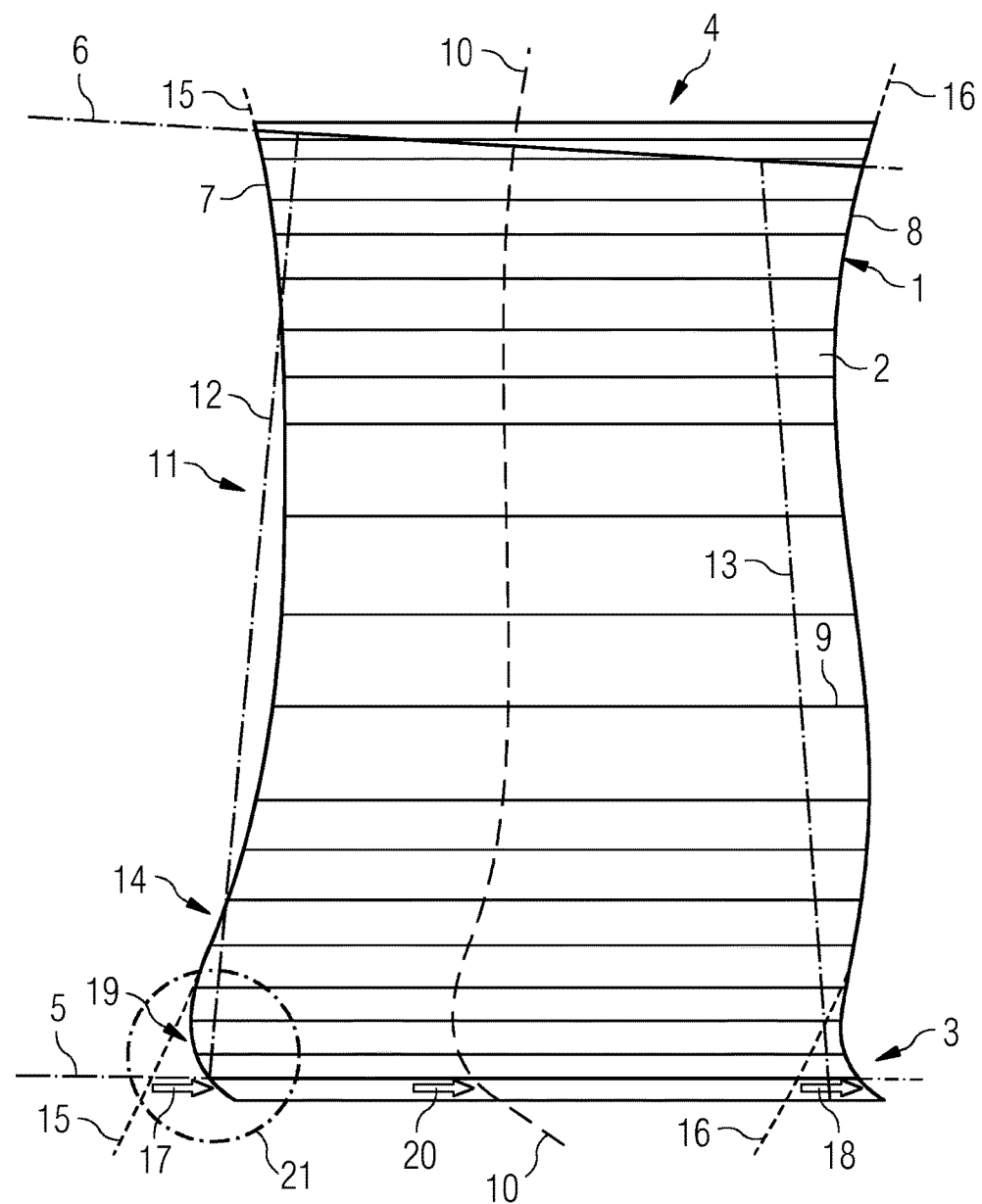
FIG. 1 shows a top view in the circumferential direction of the rotor blade.
Figure 2:
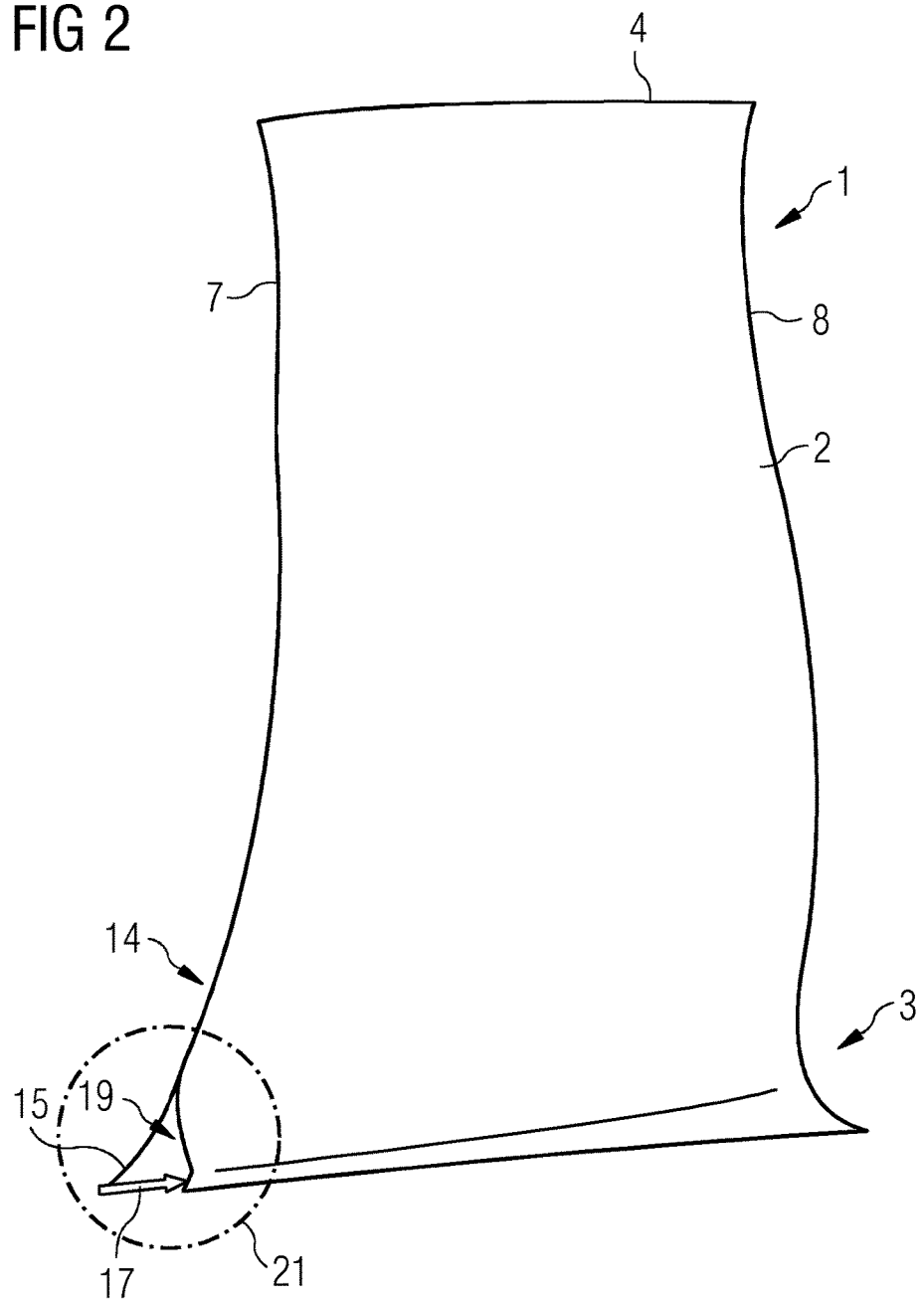
FIG. 2 shows a perspective illustration of the rotor blade from FIG. 1.

As is evident from FIGS. 1 and 2, a replacement blade 1 which is a rotor blade has an airfoil 2 and a blade root 3 which can be tension-mounted at a blade foot (not shown) with a rotor of a gas turbine by means of a form fit. For this purpose, the blade foot, which has a foot profile, is formed at the blade root 3. As a counterpiece to this, a groove with a corresponding profile is provided in the rotor, the blade foot being insertable into the groove.

At the radially facing-away end of the blade 2, the replacement blade 1 has a blade tip 4. When the replacement blade 1 is in the installed state, the blade tip 4 is arranged directly adjacently to a casing inside, a radial gap thereby being formed between the casing inside and the blade tip 4. In the design state, the blade tip 4 coincides with a casing contour line 6 which, as a consequence of operation, is stipulated for the installation and operation of the replacement blade 1 in the gas turbine. In a similar way to this, a hub contour line 5 is stipulated, by which the airfoil 2 is limited at the hub in the design state. The replacement blade 1 is tension-mounted on the hub. The airfoil 2 has a leading edge 7 and a trailing edge 8. The airfoil 2 is illustrated in FIG. 1 by a plurality of axial sections 9. Each axial section 9 has a center of gravity, the centers of gravity of the axial sections being strung along on a gravity line 10.

The replacement blade 1 is provided for an old blade 11. The old blade 11 has a leading edge 12 and a trailing edge 13. The old blade 11 is conventionally profiled, the leading edge 12 and the trailing edge 13 of the old blade 11 being of rectilinear form. In contrast to the profiling of the old blade 11, the replacement blade 1 is profiled according to modern standpoints. In line with this, the leading edge 7 of the replacement blade 1 is provided in the lower duct region with a rearward sweep 14. In addition, the leading edge 7 of the replacement blade 1 is equipped in the upper duct portion with a forward sweep.

In the profiling of the airfoil 2 of the replacement blade 1, the following procedure was adopted: first, the geometries of the hub contour line 5 and of the casing contour line 6 of the old blade 11 must be acquired. Furthermore, the axial position of the center of gravity of the airfoil of the old blade 11 and/or the maximum possible envelope of the old blade 11 must be acquired. Next, the geometry of the airfoil 2 of the replacement blade 1 must be designed, the hub section of the airfoil 2 of the replacement blade 1 having to be arranged essentially at the same location as the hub section of the airfoil of the old blade 11 and/or the mechanical integrity of the replacement blade 1 being achieved, utilizing the maximum possible envelope of the old blade 11. This is necessary since the replacement blade 1 is to be installed in the gas turbine in place of the old blade 11, the same blade fastening having to be adopted for the replacement blade 1 as for the old blade 11. Furthermore, the airfoil 2 of the replacement blade 1 has to be inclined at its leading edge 7 upstream with respect to the hub with a view to optimizing the stage efficiency, with the result that the airfoil 2 of the replacement blade 1 obtains the rearward sweep 14. The axial position of the center of gravity of the airfoil 2 of the replacement blade 1 must then be acquired.

Furthermore, a tension-mounting-near region of the airfoil 2 of the replacement blade 1 must be defined in terms according to which, in the region 21, the positive influence of the rearward sweep 14 upon stage efficiency is classified as low. For this purpose, preferably, the radial extent of the tension-mounting-side hub boundary layer of the replacement blade 1 must be estimated, this radial extent corresponding to the region 21. Alternatively to this, preferably, the radial extent of the hub-side secondary flow of the replacement blade 1 must be adopted. Furthermore, alternatively to this, the region 21 must be defined as 5% to 15% of the blade height of the replacement blade 1.

As a result of the design of the geometry of the airfoil 2 of the replacement blade 1, a leading edge line 15 and a trailing edge line 16 are obtained for the airfoil 2 of the replacement blade 1. The leading edge line 15 has the rearward sweep 14 on the hub side. The next step is to displace the airfoil portion, arranged outside the region 21, of the replacement blade 1 axially upstream until the axial position of the center of gravity of the thereby newly obtained airfoil 2 of the replacement blade 1 coincides essential with the axial position of the center of gravity of the airfoil of the old blade 11. Since the hub section of the airfoil 2 of the replacement blade 1 remains in its originally fixed position to coincide with the hub section of the old blade, in particular a leading edge offset 17 is brought about at the leading edge 7 of the airfoil 2 of the replacement blade 1 and a trailing edge offset 18 is brought about at the trailing edge 8 of the airfoil 2 of the replacement blade 1. For the transition from the hub section of the airfoil 2 of the replacement blade 1 to the airfoil portion, arranged outside the region 21, of the replacement blade 1, the leading edge must be inclined in the region 21 downstream with respect to the hub, thus resulting in a transition sweep 19 for the leading edge 7 of the replacement blade 1 in the region 21. The transition sweep 19 is a forward sweep and impairs stage efficiency to only a slight extent, since the transition sweep 19 lies in the region 21.

Owing to the provision of the leading edge offset 17, trailing edge offset 18 or transition sweep 19, a center of gravity displacement 20 takes place downstream in the hub section of the airfoil 2 of the replacement blade 1, so that the center of gravity of the airfoil 2 of the replacement blade 1 coincides essentially with the center of gravity of the airfoil of the old blade 11. Furthermore, in the design of the geometry of the airfoil, the chord length of the blade root 3 of the replacement blade 1 is selected essentially equally to the chord length of the blade root of the old blade 11.

The invention claimed is:

1. A method for profiling a replacement blade as a replacement part for an old blade for an axial-flow turbomachine, comprising:

acquiring a hub contour geometry and a casing contour geometry of a flow duct of the old blade and also an axial position of a center of gravity of an airfoil of the old blade which is tension-mounted on one side of a hub or a casing and/or of a maximum utilizable axial construction space of the old blade;

designing a geometry of an airfoil of the replacement blade, such that a tension-mounting-side section of the airfoil of the replacement blade is mounted at a same location as a tension-mounting-side section of the airfoil of the old blade, the airfoil of the replacement blade is inclined in an upstream direction at its leading edge adjacent a tension mounting, and such that the airfoil comprises a rearward sweep;

defining a tension-mounting-near region of the airfoil of the replacement blade, wherein the tension-mounting-near region is a region of the airfoil of the replacement blade starting from the tension-mounting-side section and extending toward a tip of the replacement blade a distance equal to 5% to 15% of a height of the replacement blade;

axially displacing an airfoil portion of the replacement blade, arranged outside the tension-mounting-near region of the replacement blade in the upstream direction until an axial position of the center of gravity of the airfoil of the replacement blade coincides with the axial position of the center of gravity of the airfoil of the old blade and/or a mechanical integrity of the replacement blade is achieved, utilizing the maximum utilizable axial construction space of the old blade, wherein the leading edge is inclined in a downstream direction from the tension-mounting-side section of the airfoil of the replacement blade as far as the displaced airfoil portion of the replacement blade, such that the airfoil of the replacement blade has a transition sweep from the upstream direction to the downstream direction in the tension-mounting-near region.

2. The method as claimed in claim 1, further comprising:
determining a radial extent of a hub boundary layer at a design operating point of the axial-flow turbomachine; and
fixing the distance of the tension-mounting-near region to be equal to the radial extent of the hub boundary layer.

3. The method as claimed in claim 1, further comprising:
determining a radial extent of a hub-side secondary flow at a design operating point of the axial-flow turbomachine; and fixing the distance of the tension-mounting-near region to be equal to the radial extent of the hub-side secondary flow.

4. The method as claimed in claim 1, wherein a chord length of a blade root of the replacement blade corresponds to a chord length of a blade root of the old blade.

5. The method as claimed in claim 1,
wherein the leading edge of the airfoil of the replacement blade is inclined in the upstream direction at the side facing radially away from the tension mounting such that the airfoil has a forward sweep outside the rearward sweep.

6. The method as claimed in claim 1, wherein the rearward sweep of the leading edge of the replacement blade extends only in a radial tension-mounting-side half of the flow duct.

7. A rotor blade for a gas turbine, the rotor blade comprising a profile which is designed by the method of claim 1.

8. A stator blade for a gas turbine, the stator blade comprising a profile which is designed by the method of claim 1.

9. A gas turbine comprising the rotor blade as claimed in claim 7.

10. A compressor blade comprising:
an airfoil which has a leading edge, a tension-mounting side section, and a tip, the airfoil being inclined at the leading edge in an upstream direction at a tension mounting of the airfoil in order to optimize stage efficiency such that the airfoil has a rearward sweep,
a tension-mounting-near region of the airfoil being defined, wherein the tension-mounting-near region is a region of the airfoil starting from the tension-mounting side section and extending toward the tip of the airfoil a distance equal to 5% to 15% of a height of the airfoil, and
the leading edge being inclined in a downstream direction in the tension-mounting-near region of the airfoil, wherein the leading edge of the airfoil of the airfoil comprises a forward sweep in the tension-mounting-near region nearest the tension-mounting side section, such that the airfoil of the airfoil has a transition sweep from the upstream direction to the downstream direction in the tension-mounting-near region.

11. A gas turbine comprising the stator blade as claimed in claim 8.

* * * * *